(12) United States Patent
Han

(10) Patent No.: US 6,444,125 B2
(45) Date of Patent: Sep. 3, 2002

(54) METHOD OF TREATING WASTE WATER FOR REMOVING NITROGEN AND PHOSPHORUS AND APPARATUS THEREFOR

(76) Inventor: Sang Bae Han, 4-303 Samsung Villa, 173, Sangil-Dong, Kangdong-Ku, Seoul (KR), 134-090

( * ) Notice: Subject to any disclaimer, the term of this patent is extended or adjusted under 35 U.S.C. 154(b) by 0 days.

(21) Appl. No.: 09/842,173

(22) Filed: Apr. 26, 2001

(30) Foreign Application Priority Data

Apr. 26, 2000 (KR) .............................................. 00-22287

(51) Int. Cl.[7] .................................................. C02F 3/30
(52) U.S. Cl. ....................... 210/605; 210/623; 210/624; 210/630; 210/151; 210/195.3; 210/202; 210/205; 210/220; 210/259; 210/903; 210/906
(58) Field of Search ................................... 210/605, 615, 210/616, 623, 624, 630, 150, 151, 195.1, 195.3, 197, 202, 205, 220, 259, 903, 906

(56) References Cited

U.S. PATENT DOCUMENTS

| 3,401,113 A | * | 9/1968 | Pruessner et al. |
| 3,586,625 A | * | 6/1971 | Cole et al. |
| 5,076,929 A | * | 12/1991 | Fuchs et al. |
| 5,342,522 A | * | 8/1994 | Marsman et al. |
| 5,605,629 A | * | 2/1997 | Rogalla |
| 5,766,476 A | * | 6/1998 | Valkanas et al. |
| 6,290,849 B1 | * | 9/2001 | Rykaer et al. |

FOREIGN PATENT DOCUMENTS

JP 60-38095 * 2/1985

\* cited by examiner

*Primary Examiner*—David A. Simmons
*Assistant Examiner*—Fred Prince
(74) *Attorney, Agent, or Firm*—Jacobson Holman, PLLC

(57) ABSTRACT

A method of treating sewage or waste water for removing nitrogen and phosphorus as well as organic materials in the sewage or waste water, and an apparatus therefor are provided. The method applies intermittent aeration and dynamic flow to an equipment having at least a pair of reaction basins with intermittent aeration means, a clarifier with sludge transfer means, and a filter for passing liquid without passing solid between the reaction basins. According to the method, the efficiency of removing nutrient salts is excellent and stable even in the treatment of waste water having low content of influent organisms and low C/N ratio.

13 Claims, 12 Drawing Sheets

PHASE A

PHASE B

PHASE A

PHASE B

PHASE A

PHASE A-1

PHASE B

PHASE B-1

PHASE A

PHASE B

PHASE C

PHASE D

METHOD OF TREATING WASTE WATER FOR REMOVING NITROGEN AND PHOSPHORUS AND APPARATUS THEREFOR

BACKGROUND OF THE INVENTION

1. Field of the Invention

The present invention relates to a method of treating sewage or waste water and apparatus therefor, particularly, for removing nitrogen and phosphorus as well as organic materials in the sewage or waste water, by applying intermittent aeration and dynamic flow to an equipment having at least a pair of reaction basins with intermittent aeration means, a clarifier with sludge transfer means, and a filter for passing liquid without passing solid between the reaction basins.

2. Description of the Related Art

Biological method of removing nitrogen and phosphorus in a waste water treatment plant includes an anoxic process in which free oxygen is not supplied, an anaerobic process, and an aerobic process in which oxygen is supplied. In an aerobic reaction process, organic nitrogen and ammoniacal nitrogen are oxidized into nitrate. In an anoxic reaction process, denitrification process in which the nitrate is reduced into nitrogen gas to then be released to the air is carried out. In an anaerobic reaction process, phosphorus is released from activated sludge. The released phosphorus components are taken up luxuriously by microorganisms in an aerobic reaction process. Further, the microorganisms having done the luxury uptake are removed by the waste sludge, thereby finally removing phosphorus. That is, nitrogen and phosphorus are removed by the successive repetition of anaerobic-anoxic-aerobic process.

In a conventional method for removing nitrogen and phosphorus, anaerobic basins, anoxic basins and aerobic basins are separately equipped with a constant capacity. Thus, it is impossible to meet with changes in quality and amount of influent waste water with flexibility. Also, methanol must be injected into the plant as an electron donor for denitrification, or water in a nitrification basin must be circulated to the denitrification basin of the previous phase to utilize organisms contained in the waste water. In case of injecting methanol, it costs a lot for chemicals, and in case of utilizing the organisms, the circulating flow is about 3~4 times of the influent, which increases the cost of maintenance and management including pump facilities and power supply.

To overcome such problems, methods of intermittent aeration and flow path change have been proposed. As typical conventional arts employing the intermittent aeration and flow path change, there is so called PID (Phased Isolation Ditch).

FIGS. 8A and 8B show schematically the mechanism of action of a conventional PID process for removing nitrogen and phosphorus, illustrating flow path changes in an aerated or an-aerated state for the respective phases A through D.

The overall configuration of equipment for the PID process will be described in the order of progress hereinbelow. In view of the progress of inflow, the equipment is constructed by a preliminary denitrification basin 201a, a selection basin 201b, an anaerobic basin 201c, at least two sets of oxidation ditches 202 and 203 each having an aerator and a mixer, and a clarifier 204 having a sludge collector 206. Also, there are equipped with a sludge return pump 205 and a sludge return pipe 208 for returning the sludge from the clarifier 204 to the preliminary denitrification basin 201a.

The function of the anaerobic basin 201c is to mix raw waste water with the sludge returned from the clarifier 204 and to release the phosphorus from the sludge while an anaerobic state is maintained. At this time, if chemically combined oxygen such as nitrate ($NO_3$) or nitrite ($NO_2$) exists, phosphorus is hardly released from the sludge. Thus, in the previous phase of the anaerobic basin 201c, free oxygen or nitrate contained in the raw waste water or returned sludge is first removed in the preliminary denitrification basin 201a and the selection basin 201b. The anaerobic basin 201c is constructed with at least two sets of basins in combination to prevent short circuit, and each reaction basin is equipped with a mixer 301.

The clarifier 204 is an external equipment independently installed outside the oxidation ditches 202 and 203, and the sludge collector 206, the sludge return pump 205 and the return pipe 208 are additionally installed therein. Here, the sludge return flow must be more than the total amount of the inflow.

As described above, in view of facilities, maintenance and management, the PID process requires much cost of installation, electricity and facilities management due to the construction of the preliminary denitrification basin, the selection basin, the anaerobic basin and the clarifier. Further, in the PID process, since a change between phases is not fast and clear, the processing efficiency may be lowered. The activated sludge having a reduced content of phosphorus by the release of phosphorus in an anaerobic state is converted to take up phosphorus luxuriously in an aerobic state since the microorganisms are activated. In the PID process, however, the sludge passed through the release of phosphorus in the anaerobic basin is introduced to an anoxic state in phases A and C, not to an aerobic state. Thus, the microorganisms may not be sufficiently activated, which lowers the efficiency of phosphorus uptake.

During a denitrification process, sufficient amount of organisms are required as electron donors to reduce nitrogen oxide, In the PID process, however, the sludge on which a large amount of organisms required for denitrification are adsorbed is continuously released from the oxidation ditch in which denitrification is carried out in an anoxic state, and the sludge is introduced into the oxidation ditch where a nitrification process is carried out and a large amount of organisms is unfavorable. Hence, the nitrification process requires much more time and the denitrification efficiency in the anoxic oxidation ditch is lowered for lack of organisms. That is, in the phase A in PID process, the same amount of sludge as that of inflow is continuously released from the first oxidation ditch 202 where denitrification is carried out, then flows into the second oxidation ditch 203 where nitrification is carried out. Thus, the organisms adsorbed in the sludge are washed away from the first oxidation ditch 202, which is unfavorable to denitrification. Then, the organisms are introduced into the second oxidation ditch 203 where nitrification is carried out, which is also unfavorable to nitrification. These situations also occur in phase C in which the flow path is changed and denitrification is carried out in the second oxidation ditch 203.

SUMMARY OF THE INVENTION

To solve the above problems in the conventional PID process, it is an object of the present invention to provide a method of treating sewage or waste water for removing efficiently nitrogen and phosphorus by applying intermittent aeration and change of flow path, which curtails the cost of equipment and maintenance of facilities.

It is another object of the present invention to provide an apparatus for the treatment method as described above.

To accomplish the above object, the present invention provides a method of treating a waste water for removing nitrogen and phosphorus comprising the following steps carried out repeatedly in a system comprising at least a pair of reaction basins with an intermittent aeration means, a clarifier for precipitating the reacted waste water from the reaction basins, and a filtering means equipped between the reaction basins:

introducing a raw waste water into a first reaction basin where denitrification and release of phosphorus are carried out in an anaerobic condition, discharging the waste water through the filtering means into a second reaction basin where nitrification and decomposition of organisms are carried out in an aerobic condition, and discharging the treated waste water through the clarifier and returning a sludge into the second reaction basin (phase A);

introducing a raw waste water into the second reaction basin where an aerobic reaction is carried out in an aerobic condition, and discharging the treated waste water through the clarifier and returning a sludge into the second reaction basin, while in the first reaction basin, removing phosphorus through luxury uptake of the phosphorus into the sludge in an aerobic condition without inflow and outflow (phase A-1)

introducing a raw waste water into the second reaction basin where denitrification and release of phosphorus are carried out in an anaerobic condition, discharging the waste water through the filtering means into the first reaction basin where nitrification and decomposition of organisms are carried out in an aerobic condition, and discharging the treated waste water through the clarifier and returning a sludge into the first reaction basin (phase B); and introducing a raw waste water into the first reaction basin where an aerobic reaction is carried out in an aerobic condition, and discharging the treated waste water through the clarifier and returning a sludge into the first reaction basin, while in the second reaction basin, removing phosphorus through luxury uptake of the phosphorus into the sludge in an aerobic condition without inflow and outflow (phase B-1).

To accomplish another object of the present invention, it is provided an apparatus for treating a waste water for removing nitrogen and phosphorus comprising:

at least a pair of reaction basins equipped with an intermittent aeration means;

a filtering means for passing the waste water between the reaction basins;

a clarifier for precipitating the waste water from the reaction basins;

a first flow path for introducing a raw waste water;

a second flow path for introducing the waste water from the first flow path into each reaction basin separately;

a third flow path for discharging the waste water from each reaction basin separately;

a fourth flow path for introducing the waste water from the third flow path into the clarifier;

a fifth flow path for discharging the waste water from the clarifier;

a sixth flow path for introducing a sludge into each reaction basin separately; and flow path control means equipped on the flow paths.

According to the present invention, in the reaction basin requiring an anaerobic or anoxic condition, outflow of organisms and inflow of free oxygen or nitrogen oxides from the reaction basins where decomposition of organisms and nitrification are carried out in an aerobic condition are prevented, which enhances the efficiency of denitrification. Further, in the reaction basin where nitrification is carried out in an aerobic condition, inflow of organisms from the reaction basin in an anaerobic or anoxic condition is prevented, which enhances the efficiency of nitrification. That is, the transfer of sludge is prevented between the two reaction basins in which different kinds of reactions are carried out each other, which improves both the reactions carried out in each of the reaction basins.

Further, the present invention introduce a system having flow paths and means for controlling the flow paths where the direction of flow of waste water and the direction of inflow of returned sludge are varied, for example, returned sludge is introduced into the reaction basin from which reacted waste water is discharged into a clarifier.

BRIEF DESCRIPTION OF THE DRAWINGS

The above and other objects, features, and advantages of the present invention will be apparent from the following detailed description of the preferred embodiments of the invention in conjunction with the accompanying drawings, in which.

BEST MODE FOR CARRYING OUT THE INVENTION

Now, preferred embodiments of the present invention will be described with reference to the accompanying drawings.

Figure 1A:
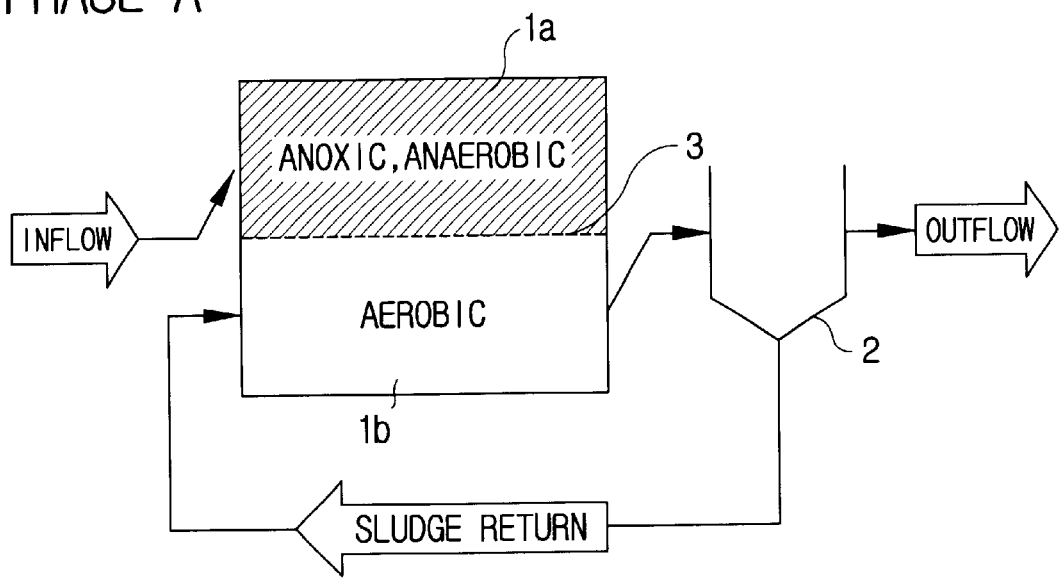
FIGS. 1A and 1B are flow diagrams of an embodiment of a method of treating waste water for removing nitrogen and phosphorus according to the present invention.
Figure 1A:
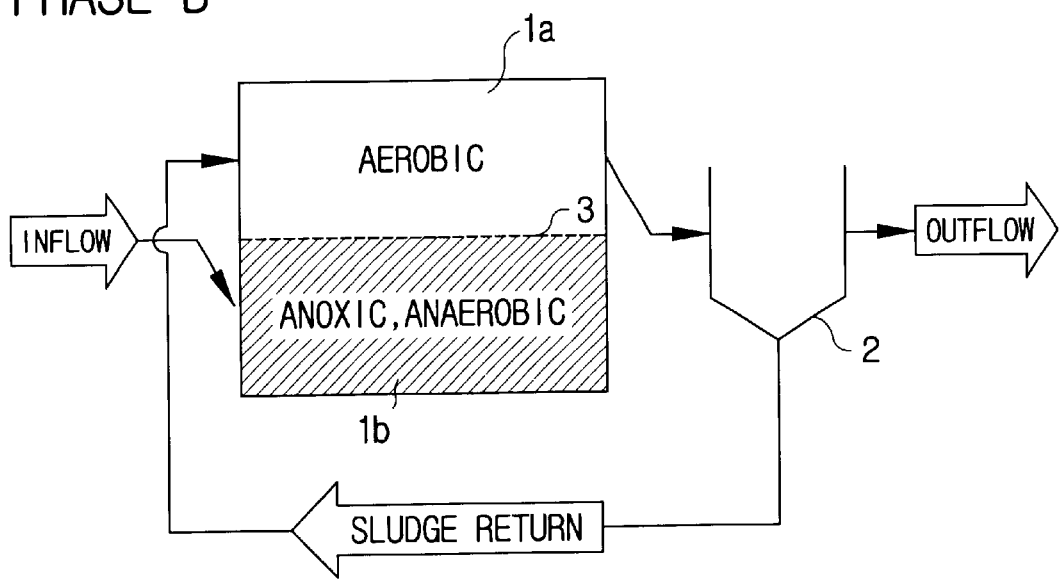
Figure 1B:
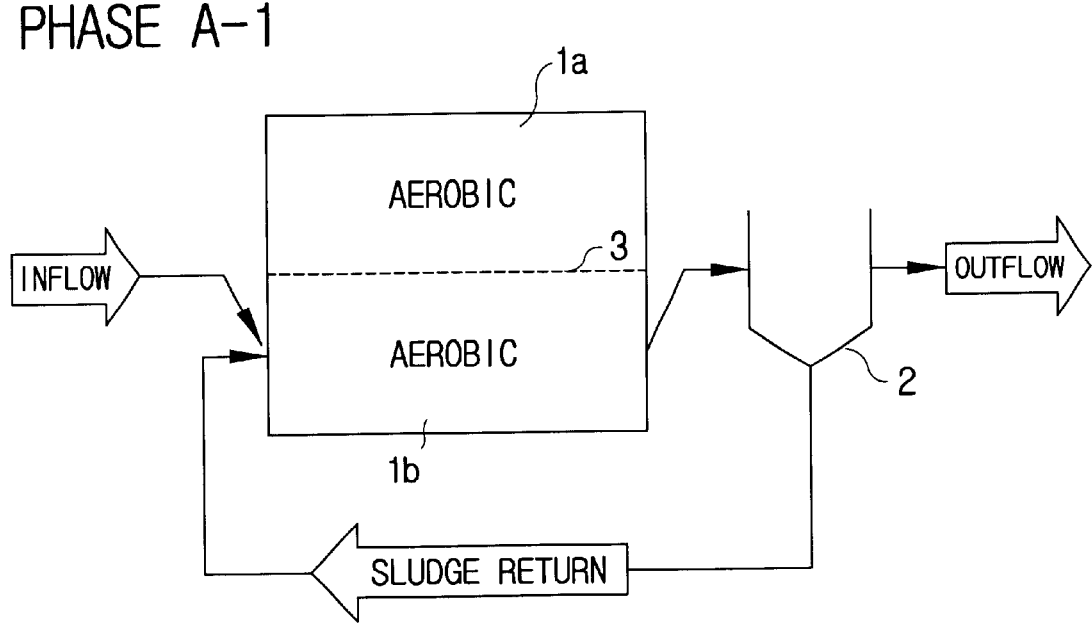
Figure 1B:
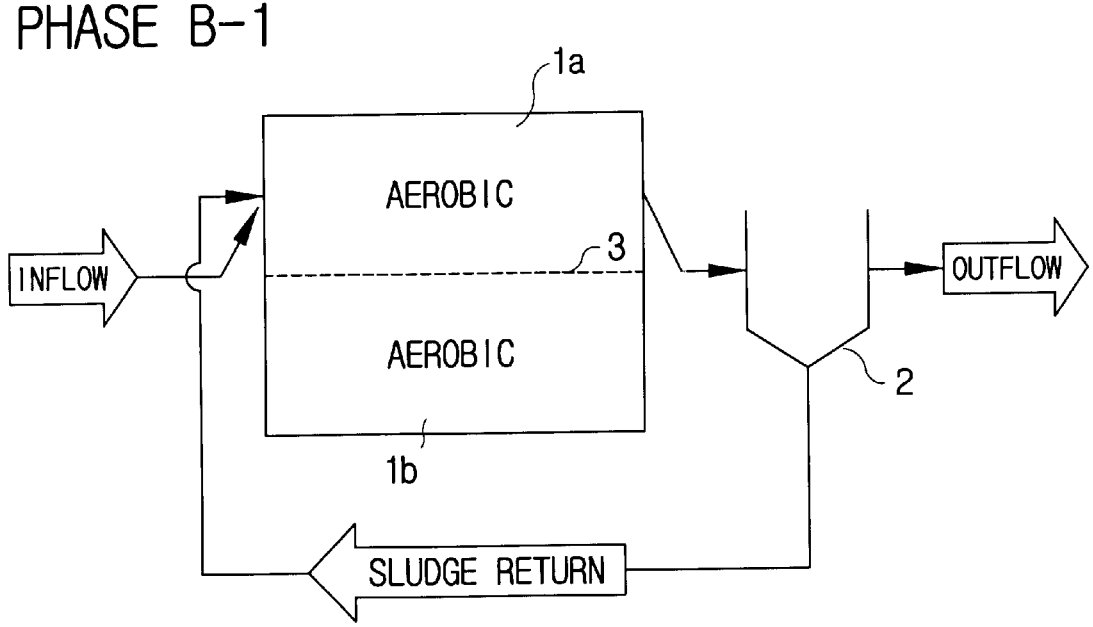

FIGS. 1A and 1B are flow diagrams of an embodiment of a method of treating waste water for removing nitrogen and phosphorus according to the present invention. In this embodiment, nitrogen and phosphorus are removed by flow path changes and intermittent aeration using an apparatus for treating waste water comprising a first and second reaction basins 1a and 1b, a clarifier 2 equipped with a means for returning sludge, and a filter for passing only filtered liquid without passing solid materials between the first reaction basin 1a and the second reaction basin 1b.

In phase A shown in FIG. 1A, denitrification, release of phosphorus, decomposition of organisms and nitrification occur in combination. Denitrification and release of phosphorus are carried out in the first reaction basin 1a, and aerobic decomposition of organisms and nitrification are carried out in the second reaction basin 1b. In view of the constitution of flow paths, influent waste water is introduced into the first reaction basin 1a, and effluent waste water from the first reaction basin 1a is discharged as treated water through the second reaction basin 1b and clarifier 2.

In the first reaction basin 1a, operation of an aerator is interrupted and a stirrer only is operated in an anoxic and anaerobic condition. During an established time from the initial state of operation, denitrification is carried out in which nitrates are reduced to free nitrogen by the organisms contained in the influent waste water. When the nitrates become exhausted completely in the complete anaerobic condition, phosphorus is released from sludge. In the second reaction basin 1b, an aerator operates to maintain aerobic condition and nitrification is carried out with aerobic decomposition of organisms.

In the present invention, the phase A substitutes for the preliminary denitrification basin, the selection basin, and the anaerobic basin in phase A of the conventional PID process. Since the effluent from the first reaction basin 1a to the second reaction basin 1b is filtrate that is separated from sludge by the filter 3, the influent from the first reaction basin 1a to the second reaction basin 1b contains no sludge. According to the present invention, sludge on which organisms are adsorbed is not discharged from the first reaction basin 1a during the process of denitrification and release of phosphorus in the phase A, so that the electron donor of organisms is not discharged from the first reaction basin 1a, which enhances the efficiency of denitrification in the first reaction basin 1a. Further, the efficiency of nitrification improves in the second reaction basin 1b where the introduced organisms decrease.

Effective release of phosphorus in the first reaction basin 1a requires complete anaerobic condition having no combined oxygen such as oxides like nitrates. The complete anaerobic condition is acquired by only lengthening the duration time of the phase A.

According to the embodiment of the present invention, since the filter 3 is equipped between the reaction basins and sludge returns to the reaction basin of aerobic condition, sludge does not move to the second reaction basin 1b but remains in the first reaction basin 1a, and the returned sludge is introduced into the second reaction basin 1b of aerobic condition. Therefore, sludge containing free oxygen and nitrates of aerobic condition in the second reaction basin 1b is not introduced into the first reaction basin 1a through the clarifier 2, which is different from the PID process containing at least two oxidation ditches combined with outer clarifier.

According to the present invention, the first reaction basin 1a come to the complete anaerobic condition during the phase A without a preliminary denitrification basin, a selection basin, and an anaerobic basin which are equipped with sludge introducing line in the PID process. This is because the returned sludge containing free oxygen or combined oxygen is not introduced into the first reaction basin 1a, which is completely exhausted of nitrates by organisms contained in the introduced raw waste water in anaerated condition.

While denitrification and release of phosphorus occur in the first reaction basin 1a during the phase A, decomposition of organisms and nitrification continue to proceed in the second reaction basin 1b operating in an aerobic condition.

In phase A-1 shown in FIG. 1B, the first reaction basin 1a that has operated in an anaerobic condition during the phase A is converted to an aerobic condition. At the same time, according to the changes of the flow paths of the influent waste water, the first reaction basin 1a operates in an unloaded condition without the influent waste water, and oxygen is consumed only for internal respiration of activated sludge and decomposition of remained organisms, which reduces greatly the consumption of oxygen. During the phase A-1, inside of the first reaction basin 1a is converted quickly into aerobic condition and the sludge, which has released phosphorus in an anaerobic condition, takes luxurious amount of phosphorus more than released amount. By removing the sludge including such concentrated phosphorus through luxury uptake of it, phosphorus is removed from the waste water.

In the phase A-1, the flow paths of phase A are changed so that raw waste water is introduced directly into the second reaction basin 1b without passing through the first reaction basin 1a, and discharged as treated water after passing through the clarifier 2. The second reaction basin 1b remains in an aerobic condition, so that organisms are decomposed and nitrification continues to proceed therein.

The phase A-1 corresponds to a transition stage for converting the phase A into phase B. If the phase A-1 is omitted and the phase A is converted directly into phase B, the effluent waste from the first reaction basin 1a is discharged through the clarifier 2 before being converted into an aerobic condition, which deteriorates the quality of treated water. That is, the phase A-1 plays an important role as a transition stage for luxury uptake of phosphorus, decomposition of remained organisms and improvement of sludge sedimentation in an aerobic condition without inflow and outflow.

The phase B, in which denitrification, release of phosphorus and nitrification are carried out, is the same as the phase A except that the flow paths and the functions of the first reaction basin 1a and the second reaction basin 1b are reversed. In the phase B, the flow paths are changed so that raw waste water is introduced into the second reaction basin 1b which is stored with nitrates due to the continued working in an aerated condition during the phases A and A-1, and operation of the aeration system is stopped so that the second reaction basin 1b operates in an anaerobic condition, which carry out denitrification. At the same time, in the first reaction basin 1a, the aeration system operates to make the basin an aerobic condition so that decomposition of organisms and nitrification are carried out.

As shown in FIG. 1A, the progress in the phase A is as follows: introduction of raw waste water→first reaction basin 1a→filter 3→second reaction basin 1b→clarifier 2→discharge of treated waste water. In the phase B, the flow paths of the phase A are changed as follows: introduction of raw waste water→second reaction basin 1b→filter 3→first reaction basin 1a→clarifier 2→discharge of treated waste water. That is, changes are made so that denitrification and release of phosphorus occurring in the first reaction basin 1a during the phase A occur in the second reaction basin 1b during the phase B, and nitrification occurring in the second reaction basin 1b during the phase A occurs in the first reaction basin 1a during the phase B. Except the changes, the aspect of the reactions of the phase B is cross-identical (mirror image) with that of the phase A.

Phase B-1 is the same as the phase A-1 except that the flow paths and the functions of the first reaction basin 1a and the second reaction basin 1b are reversed. That is, the first reaction basin 1a operates in an aerobic condition and has an inflow and outflow, while the second reaction basin 1b operates in an aerobic condition without load of organisms and flow. The phase B-1 is a transition stage of recurring from the phase B to phase A.

As shown in FIG. 1B, the flow paths in the phase A-1, introduction of raw waste water→second reaction basin 1b→clarifier 2→discharge of treated waste water, are changed into: introduction of raw waste water→first reaction basin 1a→clarifier 2→discharge of treated waste water in the phase B-1. The aspect of the reactions occurred in the first and second reaction basins of the phase B-1 are cross-identical (mirror image) with that of the phase A-1.

As described above, in the first embodiment according to the present invention, flow paths are constructed so that returned sludge is introduced only to the reaction basin in an aerobic condition in which nitrification occurs, and the returned sludge containing nitrates is not introduced into the reaction basin in which denitrification occurs. Accordingly, without removing nitrates from the returned sludge or installing the preliminary denitrification basin, selection basin, anaerobic basin for release of phosphorus, denitrification is completed by extending the operation of the first reaction basin 1a during the phase A and the second reaction basin 1b during the phase B, and phosphorus is released effectively in an absolute anaerobic condition.

The respective phases described above can be summarized in the following table 1.

TABLE 1

| Phases | Reactions First reaction basin | Reactions Second reaction Basin | Flow paths | Relevant Phases in PID process |
|---|---|---|---|---|
| A | Introduction of raw waste water Anoxic, anaerobic Denitrification Release of phosphorus Recirculation of sludge | Discharge of treated waste water Aerobic Decomposition of organisms Nitrification Inflow and outflow of sludge | Introduction of raw waste water First reaction basin Filter Second reaction basin Clarifier Discharge of treated water | Phase A in PID. Process of replacing preparative denitrification basin, selection basin and anaerobic basin in PID process. |
| A-1 | No load (without inflow and outflow) Aerobic Luxury uptake of phosphorus Recirculation of sludge | Introduction of raw waste water Discharge of treated waste water Aerobic Decomposition of organisms Nitrification Inflow and outflow of sludge | Introduction of raw waste water Second reaction basin Clarifier Discharge of treated water | Phase B in PID. (transitional stage of conversion) |
| B | Discharge of treated waste water Aerobic Decomposition of organisms Nitrification Inflow and outflow of sludge | Introduction of raw waste water Anoxic, anaerobic Denitrification Release of phosphorus Recirculation of sludge | Introduction of raw waste water Second reaction basin Filter First reaction basin Clarifier Discharge of treated water | Phase C in PID. Process of replacing preparative denitrification basin, selection basin and anaerobic basin in PID process. |
| B-1 | Introduction of raw waste water Discharge of treated waste water Aerobic Decomposition of organisms Nitrification Inflow and outflow of sludge | No load (without inflow and outflow) Aerobic Luxury uptake of phosphorus Recirculation of sludge | Introduction of raw waste water First reaction basin Clarifier Discharge of treated water | Phase D in PID. (transitional stage of conversion) |

Figure 2A:
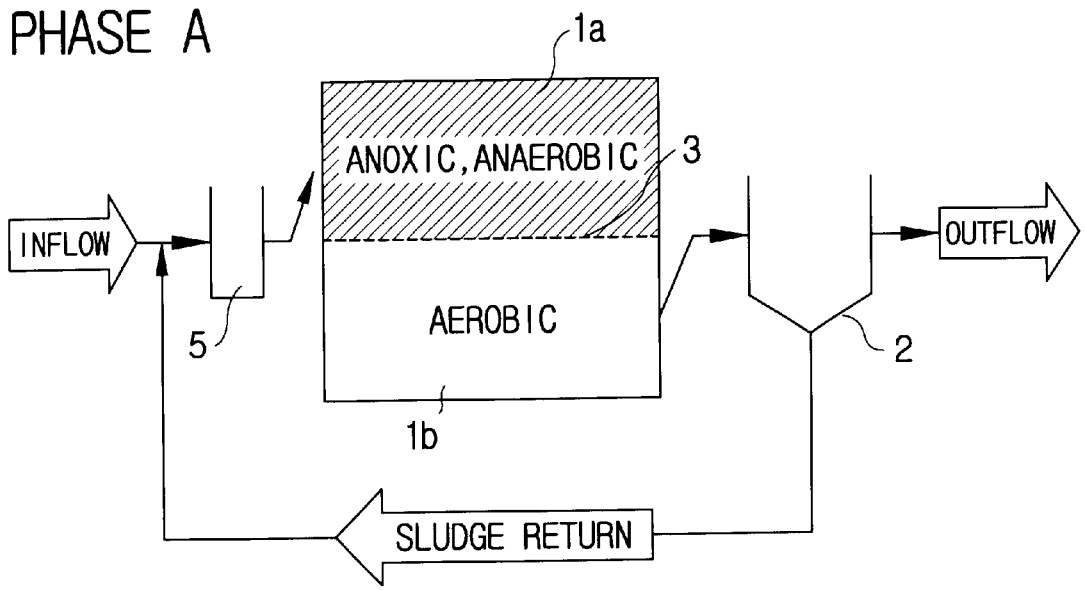
FIGS. 2A and 2B are flow diagrams showing another flow of sludge in the embodiment shown in FIGS. 1A and 1B.
Figure 2A:
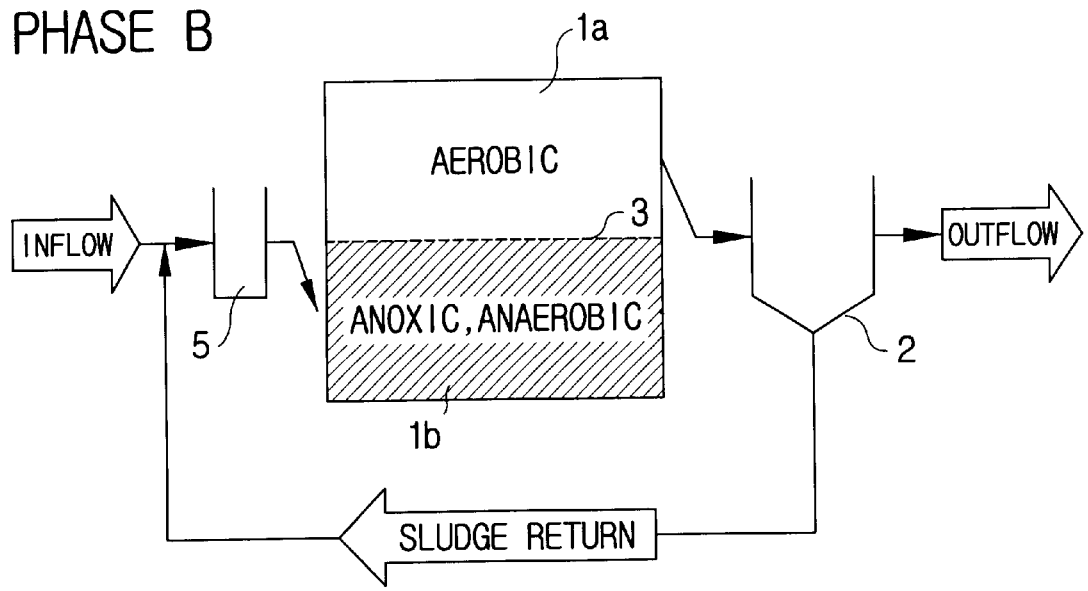
Figure 2B:
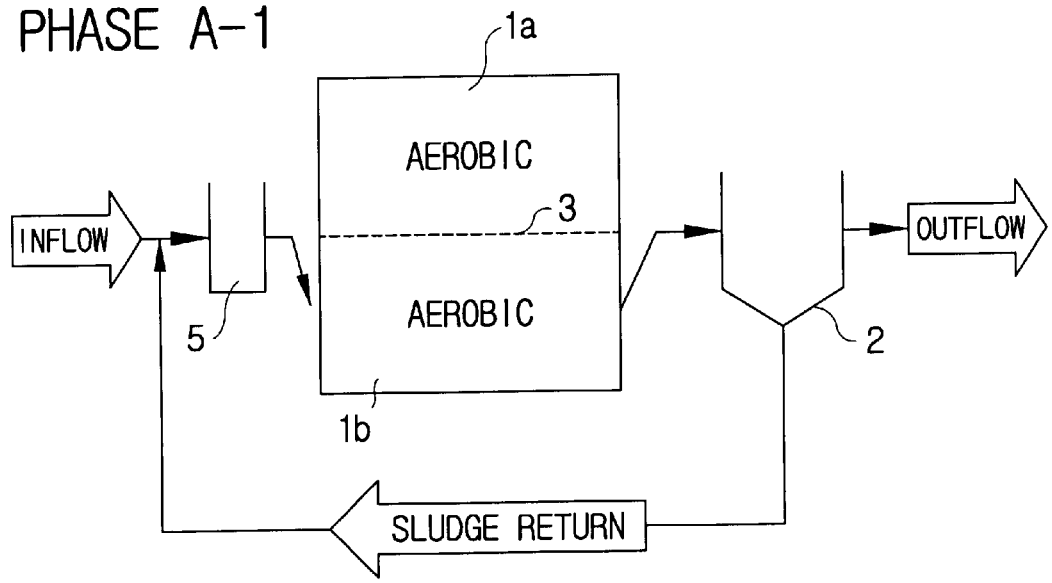
Figure 2B:
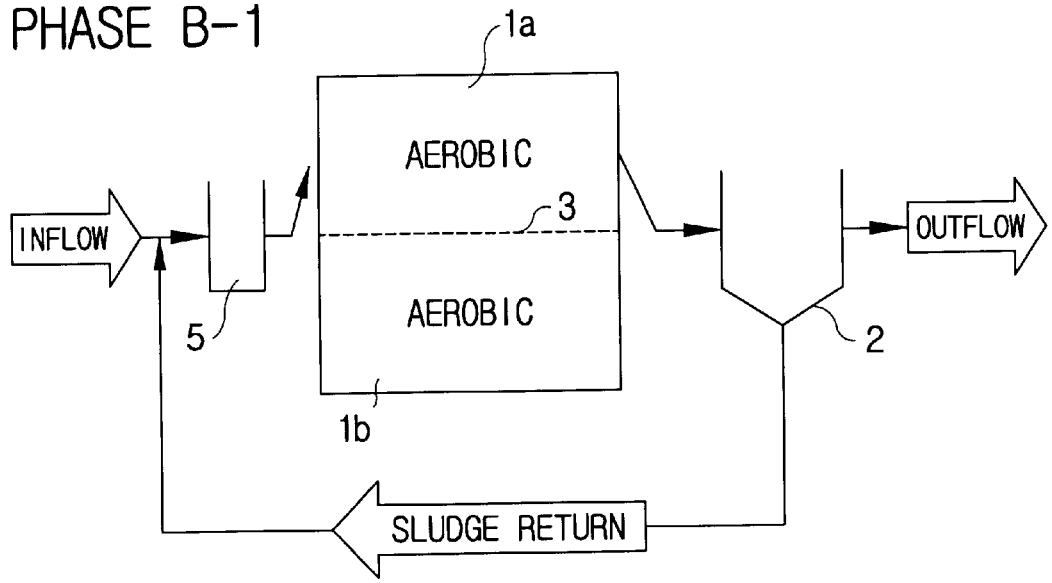

FIGS. 2A and 2B are flow diagrams showing another flow of sludge in the embodiment shown in FIGS. 1A and 1B. While in the embodiment shown in FIGS. 1A and 1B the flow paths are constructed so that raw waste water is separated from returned sludge and introduced into the reaction basin different from that having the returned sludge, in the embodiment shown in FIGS. 2A and 2B the flow paths are constructed so that raw waste water is introduced into the reaction basin having the returned sludge. In the phases A and B of this embodiment, nitrates in returned sludge are denitrified, which is the effect of preliminary denitrification. However, since these phases are constructed so that nitrates are continuously introduced into the reaction basin in an an-aerated step with stirring through returned sludge, it is impossible to reach complete anaerobic condition. Accordingly, it is difficult to accomplish an effective release of phosphorus, and it is preferable to additionally install a preliminary denitrification basin 5 in the previous stage.

In this embodiment, returned sludge is continuously introduced into the first reaction basin 1a during the phase A and into the second reaction basin 1b during the phase B. Since the sludge cannot pass through the filter 3, it is stored in the first reaction basin 1a in which denitrification and release of phosphorus are preferably carried out. Further, in the first reaction basin 1a during the phase A-1 and the second reaction basin 1b during the phase B-1, sludge concentrated in the previous phase remains in an aerobic condition without load, which is preferable to reduce the amount of sludge due to its aerobic digestion. Since this embodiment has such flow paths that in an aerobic reaction basin producing treated water the concentration of sludge reduces, it results in lowering the decomposition of organisms and efficiency of nitrification and has difficulty in controlling the flow paths. Nonetheless, this embodiment is simple in the constitution and operation of means for controlling flow paths compared to those of the first embodiment.

Figure 3:
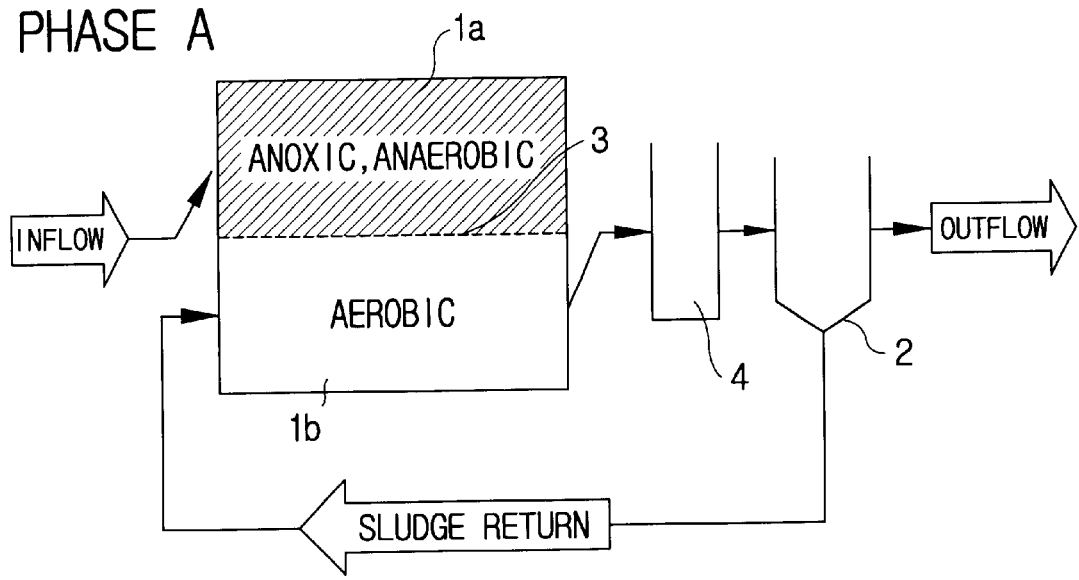
FIG. 3 is a flow diagram of another embodiment of a method of treating waste water for removing nitrogen and phosphorus according to the present invention.
Figure 3:
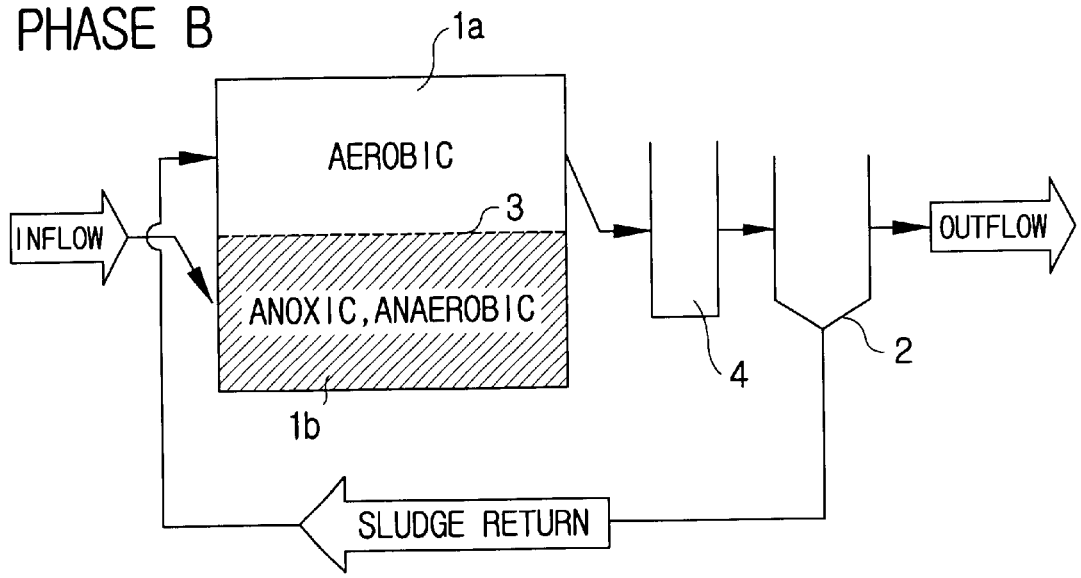

FIG. 3 is a flow diagram of another embodiment of a method of treating waste water for removing nitrogen and phosphorus according to the present invention. As described above, the phase A-1 of the first embodiment shown in FIGS. 1A and 1B is a transitional stage for converting the phase A into phase B, and phase B-1 is a transitional stage for converting the phase B to phase A. After the phase A is converted into phase B and aeration system starts, it requires a considerable time for the first reaction basin 1a which has operated in an anaerobic condition to be converted into an aerobic condition to achieve luxury uptake of phosphorus and improvement of sludge sedimentation. In the process of the first embodiment according to the present invention, since effluent water from the first reaction basin 1a is discharged through clarifier 2 concurrently with the conversion of phases, omission of the phase A-1 and direct conversion of the phase A into phase B deteriorates the quality of treated water. Likewise, direct conversion of the phase B into phase A raises the same problem in the second reaction basin 1b. Accordingly, the process of the first embodiment requires such transitional stage of conversion as phases A-1 and B-1 for luxury uptake of phosphorus, decomposition of remained organisms, and improvement of sludge sedimentation to prepare outflow.

The embodiment shown in FIG. 3 is constructed so that the effluent water from the reaction basins 1a and 1b passes through the third reaction basin 4 in an aerobic condition before being introduced into the clarifier 2. Therefore, the effluent water from the reaction basin in an anaerobic condition which has not been changed to aerobic condition yet due to the direct conversion of the phase A into phase B passes through the third reaction basin 4 in an aerobic condition, in which luxury uptake of phosphorus, aerobic digestion of remained organisms and improvement of sludge sedimentation are achieved. That is, in this embodiment, transitional stages of conversion, the phases A-1 and B-1 may be omitted, which simplifies the changes of flow paths and management of operation.

Since nitrification requires longer reaction time than denitrification does in almost waste water, the retention time of the phases A-1 and B-1 in which both reaction basins operate in an aerobic condition meet the required time for nitrification. In this embodiment, the third reaction basin 4 in an aerobic condition can fulfill the long retention time for nitrification in an aerobic condition.

In this embodiment, the inflow of returned sludge can be the same as that of raw waste water and a preliminary denitrification basin can also be added, as shown in FIGS. 2A and 2B. The third reaction basin 4 may operate in an intermittent aeration process for anticipating denitrification effect due to internal respiration and for preventing reduction of denitrification effect in the first or second reaction basin due to introduction of dissolved oxygen through returned sludge.

Figure 4:
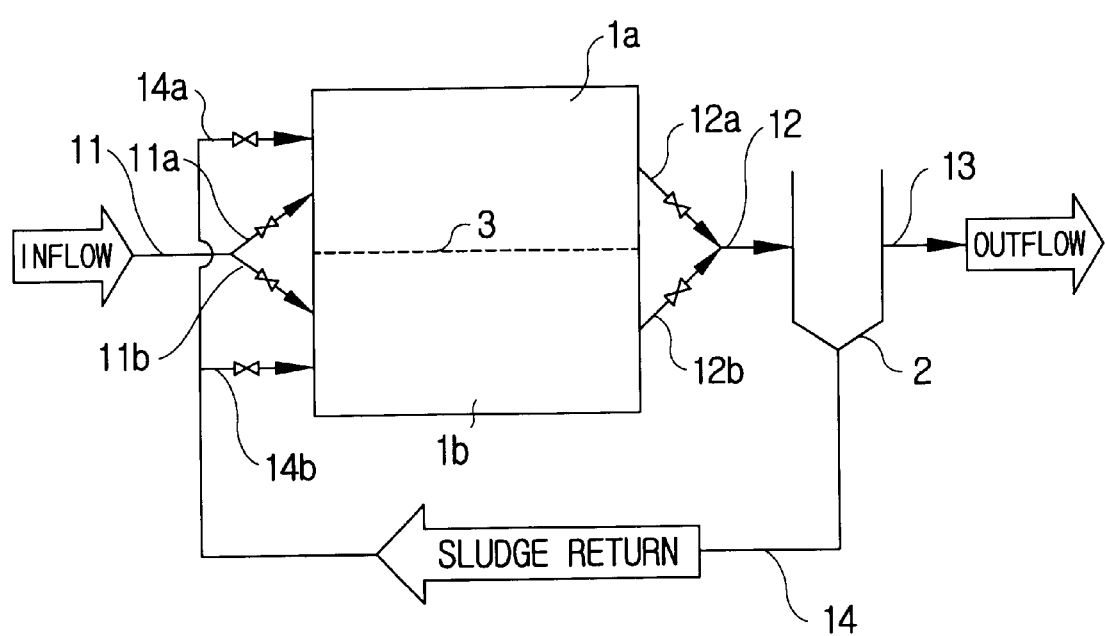
FIG. 4 illustrates schematically the constitution of flow paths required in the embodiment shown in FIGS. 1A and 1B.

FIG. 4 illustrates schematically the constitution of flow paths required in the embodiment shown in FIGS. 1A and 1B. The embodiment includes a raw waste inflow path 11, reaction basin inflow paths 11a and 11b, reaction basin outflow paths 12a and 12b for discharging reacted water from the reaction basins 1a and 1b into the clarifier 2, and a clarifier inflow path 12. The clarifier 2 has a treated water outflow path 13 for discharging treated water, and a sludge return path 14 for returning sludge from the clarifier 2 into the reaction basins, so that the direction of waste water is changed by operating the flow paths. A filter 3 is equipped between the reaction basins for passing only filtered water without passing solid materials.

The raw waste inflow path 11 is divided to construct the reaction basin inflow paths 11a and 11b so that the influent raw waste should be introduced separately into at least two reaction basins, and a flow path controller is installed on each reaction basin inflow path. Each reaction basin has a reaction basin outflow path equipped with a flow path controller so that reacted water should be discharged separately.

The reaction basin outflow paths may be combined to construct the clarifier inflow path 12. The clarifier 2 has the treated water outflow path 13 for discharging supernatant water and the sludge return path 14 for returning precipitated sludge. The sludge return path 14 is divided into a first return flow path 14a and a second return flow path 14b each equipped with a flow path controller so that returned sludge should be introduced separately into each reaction basin.

For constructing the flow paths of the phase A shown in FIG. 1A, the flow path controllers installed on the second reaction basin inflow path 11b, the first reaction basin outflow path 12a and the first return flow path 14a are closed and the other flow paths are opened. Then, the flow of waste water is as follows: introduction of raw waste →first reaction basin 1a→filter 3→second reaction basin 1b→clarifier 2→discharge of treated water. The returned sludge is introduced into the second reaction basin 1b.

For constructing the flow paths of the phase A-1 shown in FIG. 1B, the flow path controllers installed on the first reaction basin inflow path 11a, the first reaction basin outflow path 12a and the first return flow path 14a are closed and the other flow paths are opened. Then, the flow of waste water is as follows: introduction of raw waste →second reaction basin 1b→clarifier 2→discharge of treated water. The first reaction basin 1a is under no load condition without inflow and outflow and returned sludge is introduced into the second reaction basin 1b.

For constructing the flow paths of the phase B shown in FIG. 1A, the flow path controllers installed on the first reaction basin inflow path 11a, the second reaction basin outflow path 12b and the second return flow path 14b are closed and the other flow paths are opened. Then, the flow of waste water is as follows: introduction of raw waste→second reaction basin 1b→filter 3→first reaction basin 1a→clarifier 2→discharge of treated water. The returned sludge is introduced into the first reaction basin 1a.

For constructing the flow paths of the phase B-1 shown in FIG. 1B, the flow path controllers installed on the second reaction basin inflow path 11b, the second reaction basin outflow path 12b and the second return flow path 14b are closed and the other flow paths are opened. Then, the flow of waste water is as follows: introduction of raw waste→first reaction basin 1a→clarifier 2→discharge of treated water. The second reaction basin 1b is under no load condition without inflow and outflow and returned sludge is introduced into the first reaction basin 1a.

In this embodiment, the flow paths and the flow path controllers may be formed by a pipe line and valves, or various types of open paths and gates, which is also covered under the scope of the present invention. The method of regulating the flow path controllers required to construct the flow paths of the phase A to phase B-1 shown in FIGS. 1A and 1B by operating the apparatus shown in FIG. 4 will be summarized in the following table 2. In table 2, o shows the flow path in an opened state and x shows the flow path in a closed state.

TABLE 2

|  | Flow paths | | | | | |
|---|---|---|---|---|---|---|
|  | Reaction basin inflow paths | | Reaction basin outflow paths | | Return flow paths | |
| Phases | 11a | 11b | 12a | 12b | 14a | 14b |
| A | o | x | x | o | x | o |
| A-1 | x | o | x | o | x | o |
| B | x | o | o | x | o | x |
| B-1 | o | x | o | x | o | x |

This embodiment requires six flow path controllers, using one-way flow path controller. In case three-way flow path controller such as three-way valve or three-way water gate is used at the branch of each raw waste inflow path, clarifier inflow path, and sludge return flow path, however, number of the flow path controller may decrease to half, which is also covered under the scope of the present invention.

In the method and apparatus according to the present invention, the filter 3 is preferably a filtering cloth or mesh made by stacking or weaving synthetic resin or metallic fiber. Conventional filters such as filtering cloth of woven cloth or unwoven cloth, nylon used for sludge dehydrator, filtering cloth of polypropylene material, mesh structure woven by anti-corrosive metallic fiber, filtering plate constructed by stacking and pressing granular materials, etc. are preferably employed to the filter according to the present invention.

The filter is sometimes clogged by solid material. In this case, the solid material clogging the filtering cloth may be removed by way of vibrating, scraping or brushing the filtering cloths, or the solid material may be back-washed by counter flow of air or water. It is also preferable to use filtering cloth made of such materials as not being adhesive to microorganisms or to remove the solid material by a shearing force that is produced by the collision of water flow due to aeration or stirring into the surface of the filtering cloth, which makes the construction simple and prevents the consumption of additional energy.

Especially, filling fluid biological membrane carrier constructed by injected materials of ceramic or synthetic resin in a reaction basin and controlling the flow of aeration and stirring to be suitable for washing the filtering cloth can remove effectively the solid material adsorbed on the filtering cloth by the collision of the carrier as well as the water flow and air bubbles. Further, filling of carrier can have many advantages due to the adhesion and growth of microorganisms. That is, the reaction basin of the present invention may be an active sludge reaction basin due to floating multiplication or a contact oxidation basin filled with biological membrane carrier.

The filter can be replaced by the solid trap of wall type made by layering a plurality of slanted short tubes of squared or circular form or by layering a plurality of corrugated or flat boards slanted both sides into wall form without passing solid materials therethrough, as suggested in Korean Patent Application No. 10-1999-0020002 filed by the present inventor entitled "Solid trap of wall type and waste water treatment system using the same".

Figure 5:
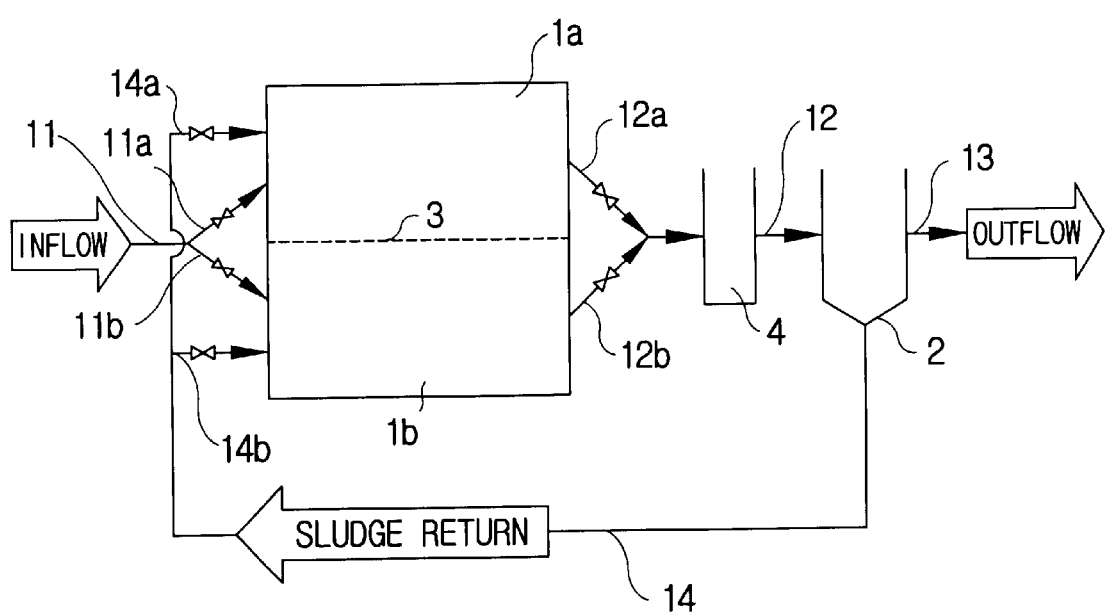
FIG. 5 illustrates schematically the constitution of flow paths required in the embodiment shown in FIG. 3.

FIG. 5 illustrates schematically the constitution of flow paths required in the embodiment shown in FIG. 3. This embodiment is identical with the embodiment shown in FIG. 4 in the constitution of apparatus and process of operation except that the third reaction basin of an aerobic condition is installed and the phases A-1 and B-1 of transitional stages of conversion are omitted.

For constructing the flow paths of the phase A shown in FIG. 3, the flow path controllers installed on the second reaction basin inflow path 11b, the first reaction basin outflow path 12a and the first return flow path 14a are closed and the other flow paths are opened. Then, the flow of waste water is as follows: introduction of raw waste →first reaction basin 1a→filter 3→second reaction basin 1b→third reaction basin 4→clarifier 2→discharge of treated water. The returned sludge is introduced into the second reaction basin 1b.

For constructing the flow paths of the phase B shown in FIG. 3, the flow path controllers installed on the first reaction basin inflow path 11a, the second reaction basin outflow path 12b and the second return flow path 14b are closed and the other flow paths are opened. Then, the flow of waste water is as follows: introduction of raw waste second reaction basin 1b→filter 3→first reaction basin 1a→third reaction basin 4→clarifier 2→discharge of treated water. The returned sludge is introduced into the first reaction basin 1a.

In this embodiment, the flow paths and the flow path controllers may be formed by a pipe line and valves, or various types of open paths and gates, which is also covered under the scope of the present invention. The method of regulating the flow path controllers required to construct the flow paths of phases A and B shown in FIG. 3 by operating the apparatus shown in FIG. 5 will be summarized in the following table 3. In table 3, o shows the flow path in an opened state and x shows the flow path in a closed state.

TABLE 3

|  | Flow paths | | | | | |
|---|---|---|---|---|---|---|
|  | Reaction basin inflow paths | | Reaction basin outflow paths | | Return flow paths | |
| Phases | 11a | 11b | 12a | 12b | 14a | 14b |
| A | o | x | x | o | x | o |
| B | x | o | o | x | o | x |

Figure 6A:
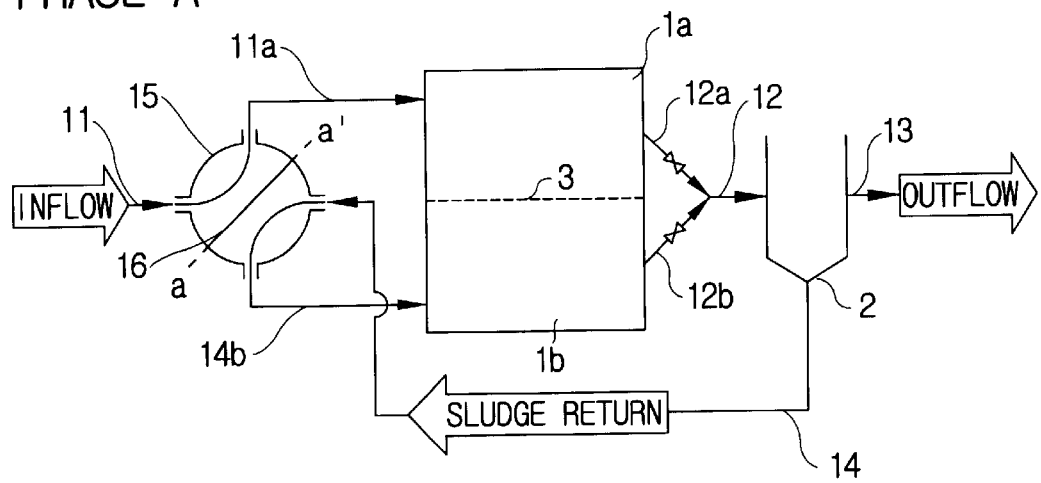
FIGS. 6A and 6B illustrate schematically the constitution of flow paths required in the embodiment shown in FIGS. 1A and 1B using a four-way flow path.
Figure 6A:
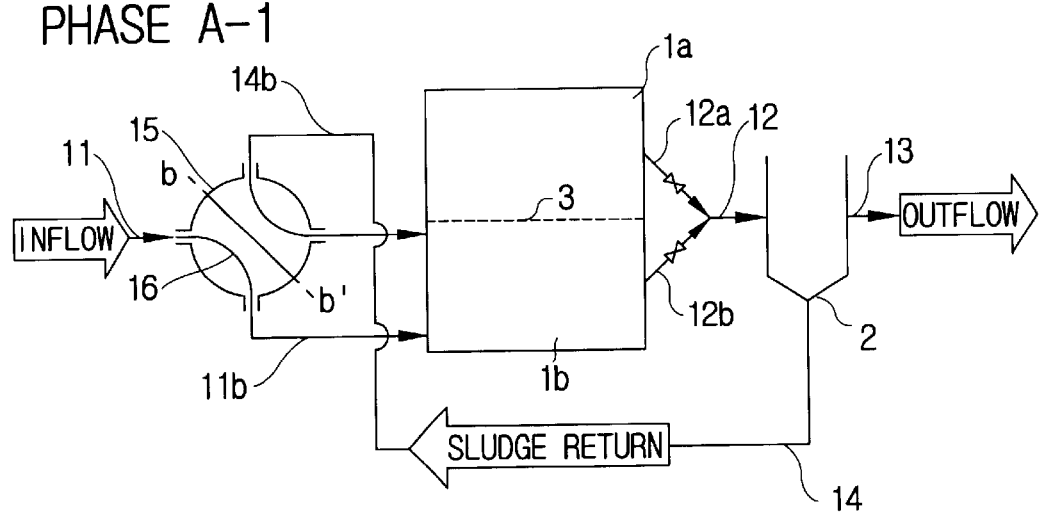
Figure 6B:
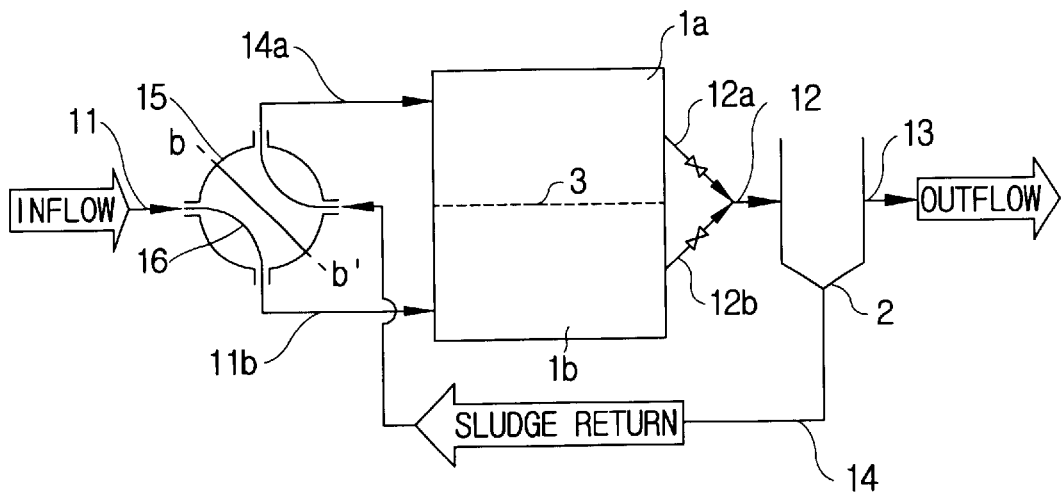
Figure 6B:
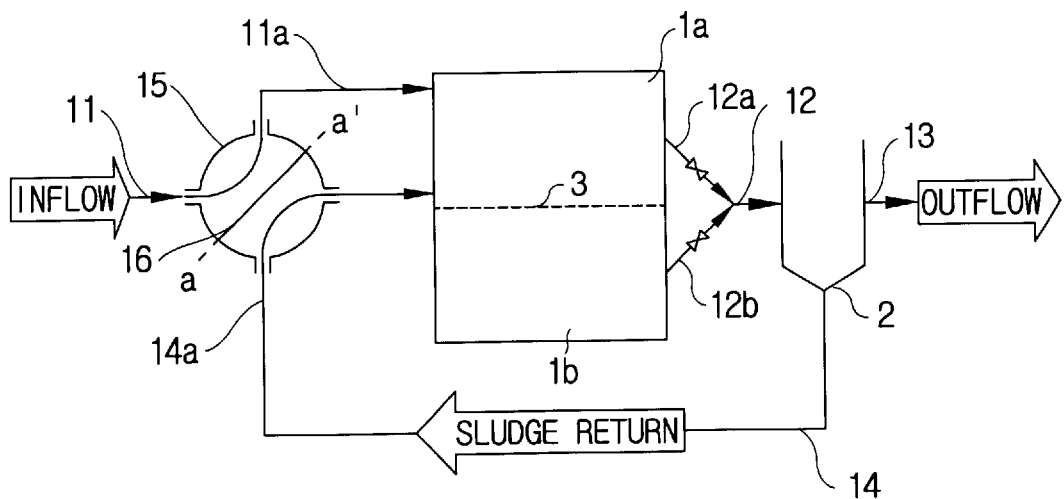

FIGS. 6A and 6B illustrate schematically the constitution of flow paths required in the embodiment shown in FIGS. 1A and 1B using a four-way flow path. Specifically, in a four-way flow path 15 such as four-way valve or four-way water path, one facing paths are connected to raw waste inflow path 11 and sludge return path 14, and the other facing paths are connected to the first reaction basin inflow path 11a and the second reaction basin inflow path 11b, so that the first and second reaction basin inflow paths are also used to introduce sludge. On the center of the four-way flow path is installed a four-way flow path controller 16 which can change the flow paths by 90°. The constitution of flow paths after the reaction basins is identical with that of the other embodiment.

Next, the process of controlling flow paths using the four-way flow path 15 is provided. For constructing the flow paths of the phase A shown in FIG. 1A, as shown in the phase A of FIG. 6A, the four-way flow path controller 16 is adjusted in the aa' direction, the flow path controller installed on the first reaction basin outflow path 12a is closed and the second reaction basin outflow path 12b is opened. Then, the flow of waste water is as follows: introduction of raw waste→first reaction basin 1a→filter 3→second reaction basin 1b→clarifier 2→discharge of treated water. The returned sludge is introduced into the second reaction basin 1b.

For constructing the flow paths of the phase A-1 shown in FIG. 1A, as shown in the phase A-1 of FIG. 6A, the four-way flow path controller 16 is adjusted in the bb' direction, the flow path controller installed on the first reaction basin outflow path 12a is closed and the second reaction basin outflow path 12b is opened. Then, the flow of waste water is as follows: introduction of raw waste→second reaction basin 1b→clarifier 2→discharge of treated water. The first reaction basin 1a is under no load condition without inflow and outflow and the returned sludge is introduced into the second reaction basin 1b.

For constructing the flow paths of the phase B shown in FIG. 1B, as shown in the phase B of FIG. 6B, the four-way flow path controller 16 is adjusted in the bb' direction, the flow path controller installed on the second reaction basin outflow path 12b is closed and the first reaction basin outflow path 12a is opened. Then, the flow of waste water is as follows: introduction of raw waste→second reaction basin 1b→filter 3→first reaction basin 1a→clarifier 2→discharge of treated water. The returned sludge is introduced into the first reaction basin 1a.

For constructing the flow paths of the phase B-1 shown in FIG. 1B, as shown in the phase B-1 of FIG. 6B, the four-way flow path controller 16 is adjusted in the aa' direction, the flow path controller installed on the second reaction basin outflow path 12b is closed and the first reaction basin outflow path 12a is opened. Then, the flow of waste water is as follows: introduction of raw waste→first reaction basin 1a→clarifier 2→discharge of treated water. The second reaction basin 1b is under no load condition without inflow and outflow and returned sludge is introduced into the first reaction basin 1a.

The method of regulating the flow path controller required to construct the flow paths of the phases A to B-1 shown in FIGS. 1A and 1B by operating the apparatus shown in FIG. 6 will be summarized in the following table 4. In table 2, o shows the flow path in an opened state and x shows the flow path in a closed state.

TABLE 4

| Phases | Adjusting direction of four-way flow path controller | Flow paths Reaction basin outflow paths 12a | 12b |
|---|---|---|---|
| A | aa' | x | o |
| A-1 | bb' | x | o |
| B | bb' | o | x |
| B-1 | aa' | o | x |

Constructing the flow paths shown in FIG. 3 is also easy and simple by using the four-way flow path controller. Specifically, the third reaction basin 4 of aerobic condition is additionally installed on the clarifier inflow path 12 of the construction shown in FIGS. 6A and 6B. The flow paths are controlled as shown in table 4 by applying the cases of the phases A and B with the exception of the phases A-1 and B-1.

Figure 7:
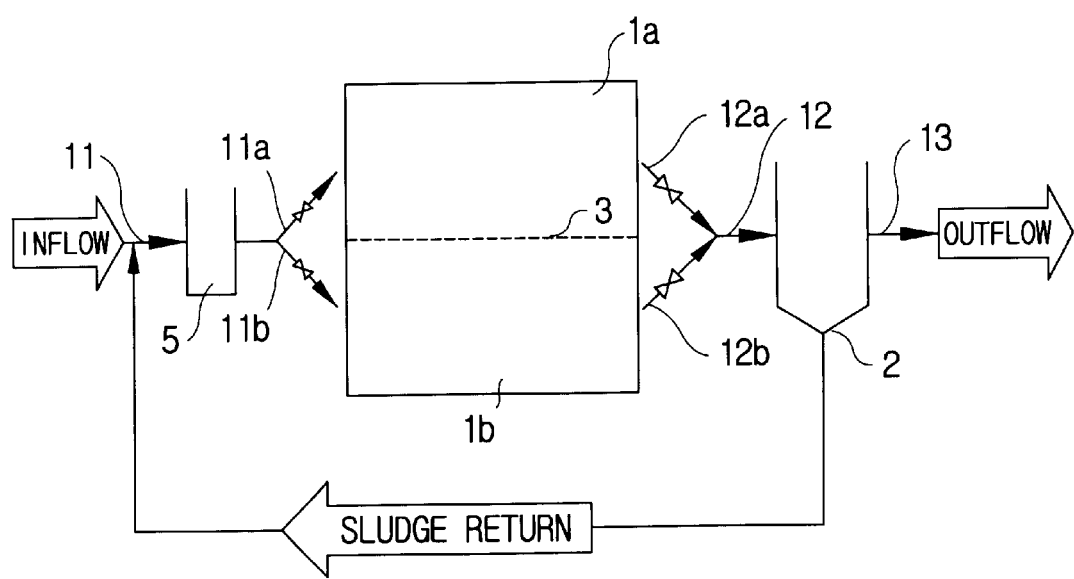
FIG. 7 illustrates schematically the constitution of flow paths required in the embodiment shown in FIGS. 2A and 2B.
Figure 8A:
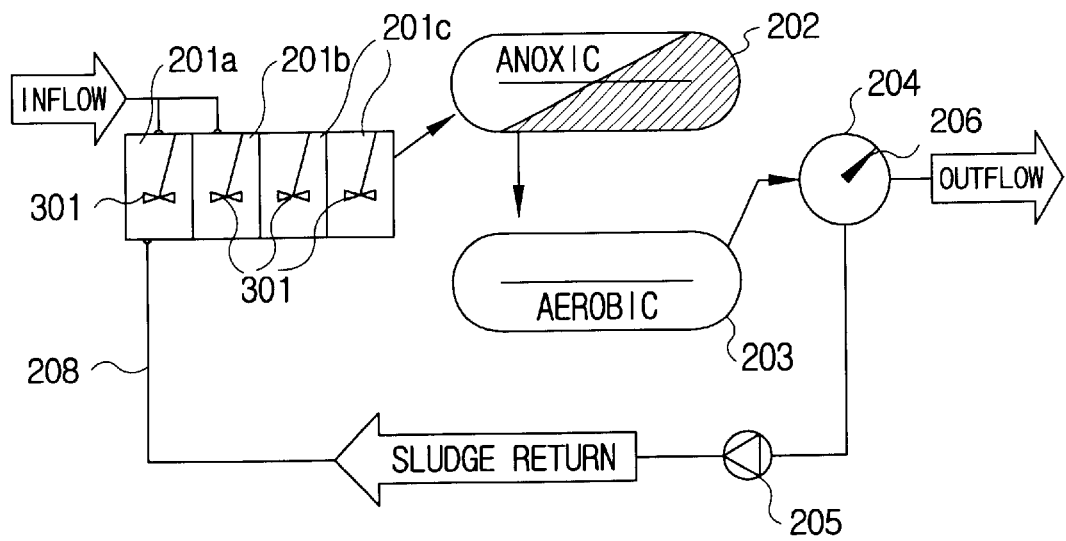
FIGS. 8A and 8B are flow diagrams of a conventional PID process for removing nitrogen and phosphorus, illustrating flow path changes in an aerated or an-aerated state for the respective phases A through D.
Figure 8A:
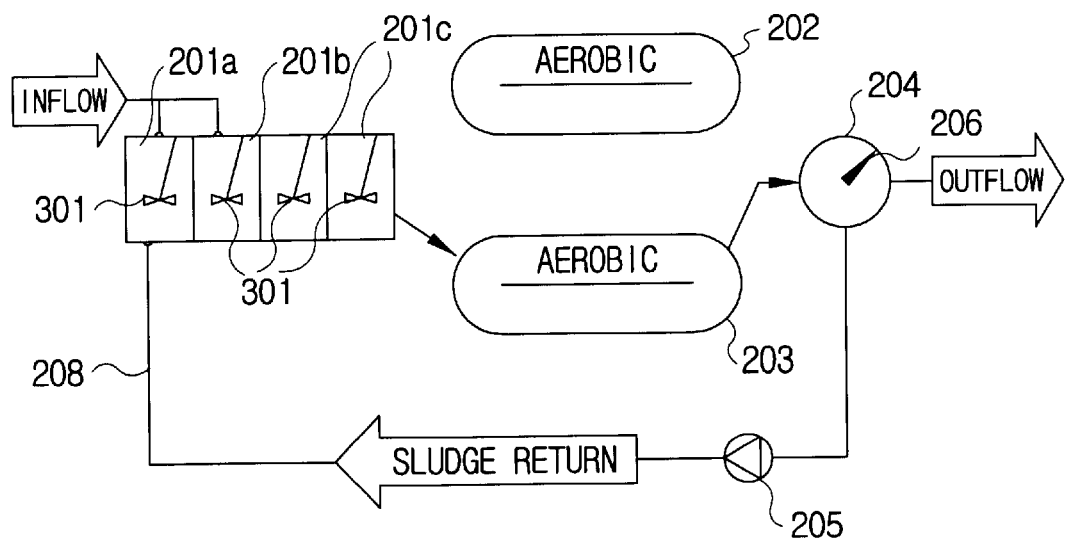
Figure 8B:
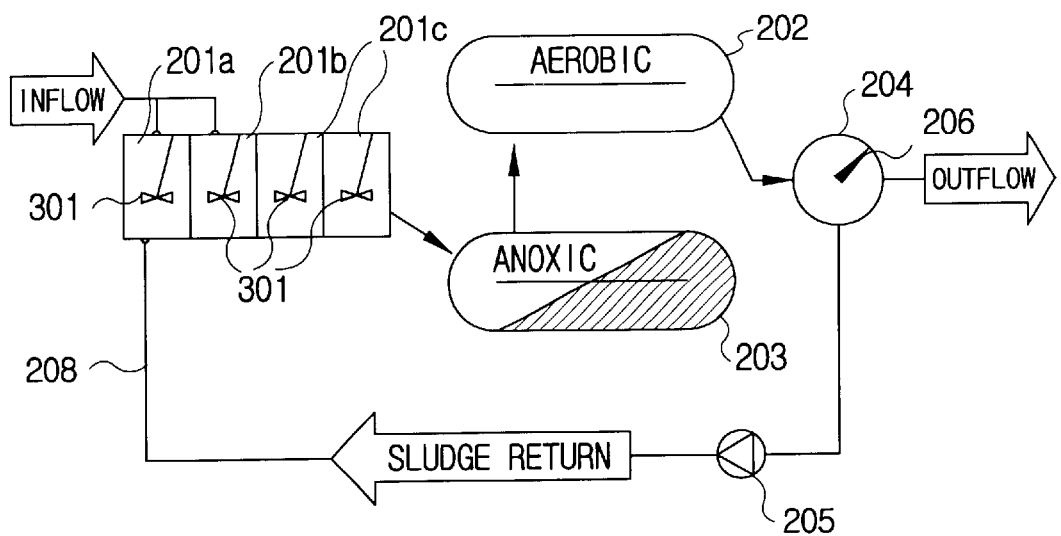
Figure 8B:
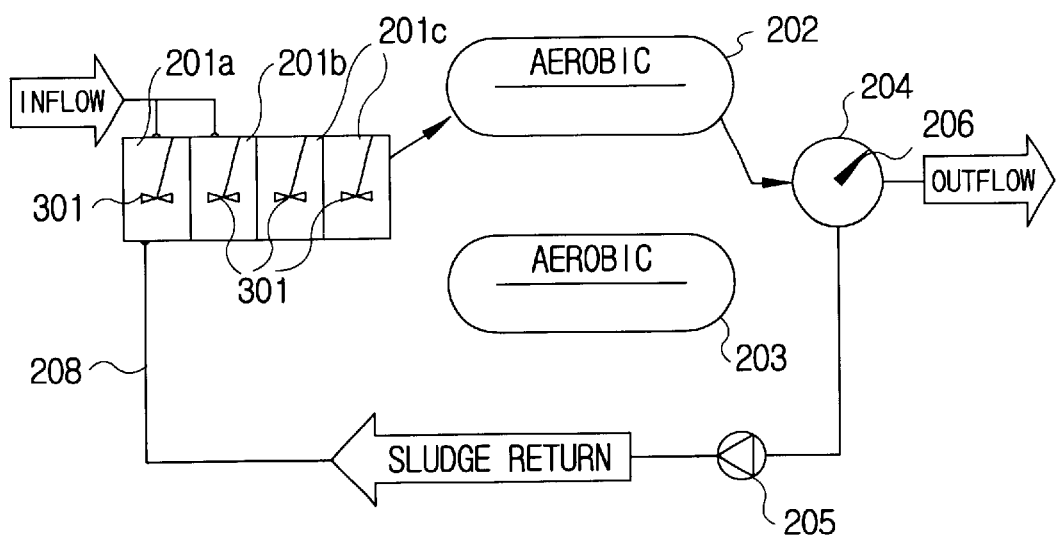

FIG. 7 illustrates schematically the constitution of flow paths required in the embodiment shown in FIGS. 2A and 2B. Specifically, a raw waste inflow path 11, reaction basin inflow paths 11a and 11b, reaction basin outflow paths 12a and 12b and a clarifier outflow path 13 are equipped in the constitution. In the clarifier 2, there are equipped a treated water outflow path 13 and a sludge return path 14 which is connected with the raw waste inflow path 11.

The raw waste inflow path 11 is divided to construct the reaction basin inflow paths 11a and 11b so that the raw waste should be introduced separately into at least two reaction basins. The preliminary denitrification basin 5 is provided between the place where the sludge return path 14 combines with the raw waste inflow path 11 and the place where the raw waste inflow path 11 is divided. The constitution of flow paths after the reaction basins is identical with that of the other embodiment.

For constructing the flow paths of the phase A shown in FIG. 2A, the flow path controllers installed on the second reaction basin inflow path 11b and the first reaction basin outflow path 12a are closed and the other flow paths are opened. Then, the flow of waste water is as follows: introduction of raw waste preliminary denitrification basin 5→first reaction basin 1a→filter 3→second reaction basin 1b→clarifier 2→discharge of treated water. The returned sludge is introduced into the first reaction basin 1a with raw waste through the preliminary denitrification basin 5.

For constructing the flow paths of the phase A-1 shown in FIG. 2A, the flow path controllers installed on the first reaction basin inflow path 11a and the first reaction basin outflow path 12a are closed and the other flow paths are opened. Then, the flow of waste water is as follows: introduction of raw waste→preliminary denitrification basin 5→second reaction basin 1b→clarifier 2→discharge of treated water. The first reaction basin 1a is under no load condition without inflow and outflow and the returned sludge is introduced into the second reaction basin 1b with raw waste through the preliminary denitrification basin 5.

For constructing the flow paths of the phase B shown in FIG. 2B, the flow path controllers installed on the first reaction basin inflow path 11a and the second reaction basin outflow path 12b are closed and the other flow paths are opened. Then, the flow of waste water is as follows: introduction of raw waste→preliminary denitrification basin 5→second reaction basin 1b→filter 3→first reaction basin 1a→clarifier 2→discharge of treated water. The returned sludge is introduced into the second reaction basin 1b with raw waste through the preliminary denitrification basin 5.

For constructing the flow paths of the phase B-1 shown in FIG. 2B, the flow path controllers installed on the second reaction basin inflow path 11b and the second reaction basin outflow path 12b are closed and the other flow paths are opened. Then, the flow of waste water is as follows: introduction of raw waste→preliminary denitrification basin 5→first reaction basin 1a→clarifier 2→discharge of treated water. The second reaction basin 1b is under no load condition without inflow and outflow and the returned sludge is introduced into the first reaction basin 1a with raw waste through the preliminary denitrification basin 5.

In this embodiment, the flow paths and the flow path controllers may be formed by a pipe line and valves, or various types of open paths and gates, which is also covered under the scope of the present invention. The method of regulating the flow path controllers required to construct the flow paths of the phases A to B-1 shown in FIGS. 2A and 2B by operating the apparatus shown in FIG. 7 will be summarized in the following table 5. In table 5, o shows the flow path in an opened state and x shows the flow path in a closed state.

TABLE 5

| | Flow paths | | | |
|---|---|---|---|---|
| | Reaction basin inflow paths | | Reaction basin outflow paths | |
| Phases | 11a | 11b | 12a | 12b |
| A | o | x | x | o |
| A-1 | x | o | x | o |
| B | x | o | o | x |
| B-1 | o | x | o | x |

As described above, according to the method and apparatus of treating waste water for removing nitrogen and phosphorus of the present invention, the efficiency of removing nitrogen and phosphorus is improved and held at a stable level. Also, the eutrophication of rivers or lakes, which is a widespread serious problem, can be reduced. Further, the system for removing nitrogen and phosphorus having following advantages can be provided:

First, the efficiency of removing nutrient salts is excellent and stable even in the treatment of waste water having low content of influent organisms and low C/N ratio.

Second, the switching of phases required for nitrification and denitrification and release and luxury uptake of phosphorus are fast and the reaction time is reduced.

Third, due to a simple process, the availability of plant site is high and maintenance and management costs are reduced.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A method of treating a waste water for removing nitrogen and phosphorus comprising the following steps carried out repeatedly in a system comprising at least a pair of reaction basins with an intermittent aeration means, a clarifier for precipitating reacted waste water from the reaction basins, and a filtering means equipped between the reaction basins:

introducing a raw waste water into a first reaction basin where denitrification and release of phosphorus are carried out in an anaerobic condition, discharging the waste water through the filtering means into a second reaction basin where nitrification and decomposition of organisms are carried out in an aerobic condition, and discharging the treated waste water through the clarifier and returning a sludge into the second reaction basin (phase A);

introducing a raw waste water into the second reaction basin where an aerobic reaction is carried out in an aerobic condition, and discharging the treated waste water through the clarifier and returning a sludge into the second reaction basin, while in the first reaction basin, removing phosphorus through luxury uptake of the phosphorus into the sludge in an aerobic condition without inflow and outflow (phase A-1)

introducing a raw waste water into the second reaction basin where denitrification and release of phosphorus are carried out in an anaerobic condition, discharging the waste water through the filtering means into the first reaction basin where nitrification and decomposition of organisms are carried out in an aerobic condition, and discharging the treated waste water through the clarifier and returning a sludge into the first reaction basin (phase B); and introducing a raw waste water into the first reaction basin where an aerobic reaction is carried out in an aerobic condition, and discharging the treated waste water through the clarifier and returning a sludge into the first reaction basin, while in the second reaction basin, removing phosphorus through luxury uptake of the phosphorus into the sludge in an aerobic condition without inflow and outflow (phase B-1).

2. A method of treating a waste water for removing nitrogen and phosphorus comprising the following steps carried out repeatedly in a system comprising at least a pair of reaction basins with an intermittent aeration means, a clarifier for precipitating reacted waste water from the reaction basins, a filtering means equipped between the reaction basins, and a preliminary denitrification basin installed in a previous stage of the reaction basins:

introducing a raw waste water through the preliminary denitrification basin into a first reaction basin where denitrification and release of phosphorus are carried out in an anaerobic condition, discharging the waste water through the filtering means into a second reaction basin where nitrification and decomposition of organisms are carried out in an aerobic condition, and discharging the treated waste water through the clarifier and returning a sludge through the preliminary denitrification basin into the first reaction basin (phase A);

introducing a raw waste water through the preliminary denitrification basin into the second reaction basin where an aerobic reaction is carried out in an aerobic condition, and discharging the treated waste water through the clarifier and returning a sludge through the preliminary denitrification basin into the second reaction basin, while in the first reaction basin, removing phosphorus through luxury uptake of the phosphorus into the sludge in an aerobic condition without inflow and outflow (phase A-1)

introducing a raw waste water through the preliminary denitrification basin into the second reaction basin where denitrification and release of phosphorus are carried out in an anaerobic condition, discharging the waste water through the filtering means into the first reaction basin where nitrification and decomposition of organisms are carried out in an aerobic condition, and discharging the treated waste water through the clarifier and returning a sludge through the preliminary denitrification basin into the second reaction basin (phase B); and introducing a raw waste water through the preliminary denitrification basin into the first reaction basin where an aerobic reaction is carried out in an aerobic condition, and discharging the treated waste water through the clarifier and returning a sludge through the preliminary denitrification basin into the first reaction basin, while in the second reaction basin, removing phosphorus through luxury uptake of the phosphorus into the sludge in an aerobic condition without inflow and outflow (phase B-1).

3. A method of treating a waste water for removing nitrogen and phosphorus comprising the following steps carried out repeatedly in a system comprising at least a pair of reaction basins with an intermittent aeration means, a clarifier for precipitating reacted waste water from the reaction basins, a filtering means equipped between the reaction basins, and an additional reaction basin installed in a previous stage of the clarifier:

introducing a raw waste water into a first reaction basin where denitrification and release of phosphorus are carried out in an anaerobic condition, discharging the waste water through the filtering means into a second reaction basin and a third reaction basin where nitrification and decomposition of organisms are carried out in an aerobic condition, and discharging the treated waste water through the clarifier and returning a sludge into the second reaction basin (phase A); and introducing a raw waste water into the second reaction basin where denitrification and release of phosphorus are carried out in an anaerobic condition, discharging the waste water through the filtering means into the first reaction basin and a third reaction basin where nitrification and decomposition of organisms are carried out in an aerobic condition, and discharging the treated waste water through the clarifier and returning a sludge into the first reaction basin (phase B).

4. The method according to claim 3, wherein the third reaction basin operates in an intermittent aeration process.

5. An apparatus for treating a waste water for removing nitrogen and phosphorus comprising:

at least a pair of reaction basins equipped with an intermittent aeration means;

a filtering means for passing the waste water between the reaction basins;

a clarifier for precipitating the waste water from the reaction basins;

a first flow path for introducing a raw waste water;

a second flow path for introducing the waste water from the first flow path into each reaction basin separately;

a third flow path for discharging the waste water from each reaction basin separately;

a fourth flow path for introducing the waste water from the third flow path into the clarifier;

a fifth flow path for discharging the waste water from the clarifier;

a sixth flow path for introducing a sludge into each reaction basin separately; and flow path control means equipped on the flow paths.

6. The apparatus according to claim 5, wherein the filtering means is a filtering cloth or mesh made by stacking or weaving synthetic resin or metallic fiber.

7. The apparatus according to claim 5, wherein the filtering means is made by layering a plurality of short tubes or flat boards slanted both sides into wall form.

8. The apparatus according to claim 5, wherein the reaction basins are active sludge reaction basins due to floating multiplication or contact oxidation basins filled with biological membrane carrier.

9. The apparatus according to claim 5, wherein a preliminary denitrification basin is further installed in the first flow path.

10. The apparatus according to claim 9, wherein the sixth flow path is connected with the first flow path so that the returned sludge is introduced into the reaction basin where the raw waste water is introduced.

11. The apparatus according to claim 5, wherein at least one reaction basin is further installed in the fourth flow path.

12. The apparatus according to claim 5, wherein the flow path control means equipped on the first flow path and the sixth flow path are four-way flow path control means.

13. The apparatus according to claim 5, wherein the flow path control means equipped on the second flow path, the third flow path and the sixth flow path are three-way flow path control means.

* * * * *